(12) United States Patent
Messinger et al.

(10) Patent No.: US 11,724,802 B1
(45) Date of Patent: Aug. 15, 2023

(54) LIGHTWEIGHT ROTOR CONVERSION SYSTEMS FOR TILTROTOR AIRCRAFT

(71) Applicant: AVX Aircraft Company, Benbrook, TX (US)

(72) Inventors: Stan Messinger, Hurst, TX (US); Clayton Messinger, Grapevine, TX (US); George Steven Lewis, Alvarado, TX (US)

(73) Assignee: AVX AIRCRAFT COMPANY, Benbrook, TX (US)

( * ) Notice: Subject to any disclaimer, the term of this patent is extended or adjusted under 35 U.S.C. 154(b) by 183 days.

(21) Appl. No.: 17/346,671

(22) Filed: Jun. 14, 2021

Related U.S. Application Data (60) Provisional application No. 63/039,212, filed on Jun. 15, 2020.

(51) Int. Cl.
*B64C 29/00* (2006.01)

(52) U.S. Cl.
CPC ................. *B64C 29/0033* (2013.01)

(58) Field of Classification Search
CPC .................................... B64C 29/0033
See application file for complete search history.

(56) References Cited

U.S. PATENT DOCUMENTS

| | | | |
|---|---|---|---|
| 5,054,716 A * | 10/1991 | Wilson | B64D 35/00 244/66 |
| 5,092,539 A * | 3/1992 | Caero | F16H 25/2204 254/102 |
| 6,247,667 B1 | 6/2001 | Fenny et al. | |
| 7,871,033 B2 | 1/2011 | Karem et al. | |
| 11,142,315 B2 | 10/2021 | McAdoo | |
| 2008/0247876 A1 | 10/2008 | Stamps et al. | |

(Continued)

FOREIGN PATENT DOCUMENTS

| | | | |
|---|---|---|---|
| EP | 1704089 B1 | 9/2012 | |
| FR | 2830237 A1 * | 4/2003 | ............. B64C 27/26 |

OTHER PUBLICATIONS

AgustaWestland AW609, from Wikipedia https://en.wikipedia.org/wiki/AgustaWestland_AW609, accessed Jun. 16, 2021, last edited May 8, 2021, 15 pages.

(Continued)

*Primary Examiner* — Tien Q Dinh
*Assistant Examiner* — William L Gmoser
(74) *Attorney, Agent, or Firm* — Greenberg Traurig, LLP (57) ABSTRACT

A conversion system for a tiltrotor aircraft may be configured to control tilting of a pylon assembly relative to a wing of the aircraft. The system may include a means for generating asymmetric thrust with a propulsion rotor carried by the pylon assembly to generate a first torque on the pylon assembly in a first direction. The system may include a brake mechanism to selectively resist the first torque on the pylon assembly by applying a second torque to the pylon assembly in a second direction opposite the first direction. The rotor (via asymmetric thrust generated by the rotor) and the brake mechanism are coordinated to work against each other to control the tilt rate and angle of the pylon assembly during conversion between flight modes of the tiltrotor aircraft. Other aspects of the present technology include methods of tilting rotors of tiltrotor aircraft using asymmetric thrust and brake mechanisms.

20 Claims, 5 Drawing Sheets

(56) References Cited

U.S. PATENT DOCUMENTS

| | | | | |
|---|---|---|---|---|
| 2015/0360774 A1* | 12/2015 | Covington | ............. | B64D 35/08 |
| | | | | 244/7 R |
| 2016/0083075 A1* | 3/2016 | Moxon | ................. | B64D 45/00 |
| | | | | 244/13 |
| 2018/0162519 A1* | 6/2018 | Parham, Jr. | ............. | B64C 27/35 |
| 2020/0317332 A1* | 10/2020 | Didey | .................... | B64C 39/08 |
| 2021/0371096 A1* | 12/2021 | Anderson | ............... | B64C 39/12 |

OTHER PUBLICATIONS

Dynamic Flight, Inc., "Blade Flapping," http://www.dynamicflight.com/aerodynamics/flapping, accessed Jun. 16, 2021, 3 pages.

Fenster, B. J., "What is Cyclic Feathering," Helicopter Study Guide, Practical Review for the Checkride, www.helicopterstudygide.com/what-is-cyclic-feathering, Aug. 16, 2018, 3 pages.

Harrington, et al., "Excalibur—The Cutting Edge in Tiltrotor Technology," University of Maryland, Alfred Gessow Rotorcraft Center, Department of Aerospace Engineering, Jun. 2011, 113 pages, available at https://vtol.org/files/dmfile/excalibur1.pdf.

Heli Start, "Rotorhead Types," http://www.helistart.com/RotorheadTypes.aspx, accessed Jun. 16, 2021, 3 pages.

Lacy, C., "Bell's 609 Civil Tiltrotor Promises New VTOL Possibilities," Sep. 1998 Professional Pilot Magazine's "Flightcheck" available at https://www.claylacy.com/insights/bell-609-civil-tiltrotor/, 11 pages.

Lombardi, F., Rotor & Wing International, "Hinge Offset," https://www.rotorandwing.com/2013/10/01/hinge-offset/, Oct. 1, 2013, 2 pages.

Mattingly, D., "Flight Control Design Characteristics of a Civilian Powered Lift Category Aircraft," Southern Illinois University Department of Aviation Technologies, https://www.vaughn.edu/assets/downloads/ATECDRAFTSubmittal-Mattingly.pdf, 9 pgs.

\* cited by examiner

LIGHTWEIGHT ROTOR CONVERSION SYSTEMS FOR TILTROTOR AIRCRAFT

CROSS-REFERENCE TO RELATED APPLICATION

The present application claims priority to U.S. Provisional Patent Application No. 63/039,212, filed Jun. 15, 2020, which is incorporated herein by reference in its entirety.

STATEMENT REGARDING FEDERALLY SPONSORED RESEARCH

The inventions disclosed herein were made with government support under W911W6-13-2-0004 awarded by the United States Army Contracting Command. The government has certain rights in the inventions.

TECHNICAL FIELD

The present disclosure is directed generally to rotor conversion systems and methods for tiltrotor aircraft.

BACKGROUND

Tiltrotor aircraft include movable (tiltable) rotors that can be positioned in a vertical plane of rotation to provide forward thrust for forward horizontal flight like a conventional fixed-wing aircraft, or in a horizontal plane of rotation to provide vertical thrust for vertical flight like a helicopter. Accordingly, tiltrotor aircraft can perform vertical take-off and landing (VTOL) as well as forward flight, and they can transition (convert) between configurations in midair.

Conventional tiltrotor aircraft have heavy conversion systems for tilting the aircraft's rotors between the horizontal and vertical flight regimes. For example, some tiltrotor aircraft convert between flight regimes using a complicated ball screw actuator. Conventional tiltrotor conversion systems, including those that use a ball screw actuator, are heavy, complicated, and have high maintenance costs due to their susceptibility to wear.

SUMMARY

Representative aspects of the present technology include a tiltrotor aircraft having a pylon assembly supported by a wing of the aircraft, wherein the pylon assembly is tiltable around a tilt axis between a first configuration and a second configuration. A rotor may be supported by the pylon and configured to provide thrust for the aircraft along a first thrust direction when the pylon assembly is in the first configuration and along a second thrust direction different from the first thrust direction when the pylon assembly is in the second configuration. The rotor may be configured to selectively provide asymmetric thrust to generate torque about the tilt axis in a first torque direction. In some embodiments, the asymmetric thrust is generated by cyclic feathering of the rotor, which creates a moment about a rotor hub that results in the torque about the tilt axis. The aircraft may further include a brake mechanism operatively positioned between the pylon assembly and the wing. The brake mechanism is positioned to selectively resist tilting of the pylon assembly relative to the wing by applying torque to the pylon assembly about the tilt axis in a second torque direction that is opposite the first torque direction (i.e., to selectively resist the moment generated by the asymmetric thrust of the rotor).

Other representative aspects of the present technology include conversion systems for tiltrotor aircraft. A conversion system may be configured to control tilting of a pylon assembly relative to a wing of the aircraft. A conversion system may include a means for generating asymmetric thrust with a propulsion rotor carried by the pylon assembly to generate a first torque on the pylon assembly in a first direction, and a brake mechanism operatively positioned between the pylon assembly and the wing. The brake mechanism may be positioned to selectively resist the first torque on the pylon assembly by applying a second torque to the pylon assembly in a second direction opposite the first direction.

Other representative aspects of the present technology include methods of tilting a rotor of a tiltrotor aircraft. Methods may include generating asymmetric thrust using the rotor (for example, by cyclic feathering of the rotor blades). The asymmetric thrust generates a torque force that tends to tilt the rotor and the supporting structure for the rotor (such as a pylon assembly carrying the rotor). Methods may further include generating a resistance force from a brake mechanism to resist the torque force from the asymmetric thrust. The asymmetric thrust and the brake mechanism are coordinated against each other to control tilting of the rotor.

Embodiments of the present technology provide conversion systems that have reduced weight and maintenance needs relative to conventional conversion systems. Embodiments of the present technology reduce or eliminate the need for conventional elements of conventional conversion systems, such as ball screw mechanisms.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the several views.

DETAILED DESCRIPTION

The present technology is directed generally to rotor conversion systems for tiltrotor aircraft and associated methods. Various embodiments of the present technology will now be described. The following description provides specific details for a thorough understanding and enabling description of these embodiments. One skilled in the art will understand, however, that the invention may be practiced without many of these details. Additionally, conventional or well-known aspects of aircraft, including tiltrotor aircraft, and components of propulsion systems such as rotors, may not be shown or described in detail so as to avoid unnecessarily obscuring the relevant description of the various embodiments.

Any of the features described herein may be combined in suitable manners with any of the other features described herein without deviating from the scope of the present technology. Accordingly, embodiments of the present technology may include additional elements, or may exclude some of the elements described below with reference to FIGS. 1-5, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

As used herein, the term "and/or" when used in the phrase "A and/or B" includes A alone, B alone, and both A and B. A similar manner of interpretation applies to the term "and/or" when used in a list of more than two terms. Further, unless otherwise specified, terms such as "attached" or "connected" are intended to include integral connections, as well as connections between physically separate components.

Figure 1:
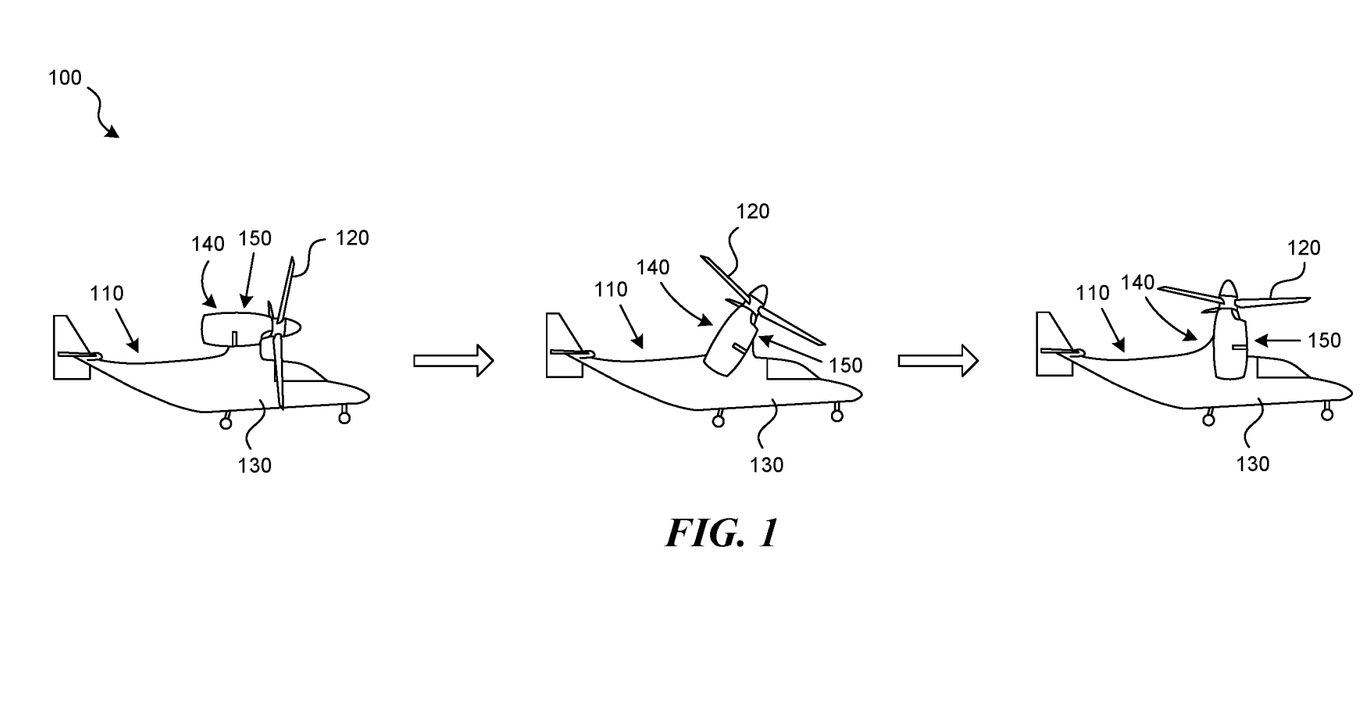
FIG. 1 is a schematic view of a conversion sequence for a tiltrotor aircraft configured in accordance with embodiments of the present technology.

FIG. 1 illustrates a schematic view of a conversion sequence 100 for a tiltrotor aircraft 110, as it converts from a generally horizontal or forward flight configuration or "airplane mode" (in which rotors 120 are positioned in a vertical plane of rotation for thrust along a horizontal direction) to a generally vertical flight configuration or "helicopter mode" (in which the rotors 120 are positioned in a horizontal plane of rotation for thrust along a vertical direction). The aircraft 110 may perform vertical takeoff and landing procedures and other rotorcraft operations when the rotors 120 are in a horizontal or nearly horizontal plane of rotation, and it may perform forward or horizontal flight when the rotors 120 are in a vertical or nearly vertical plane of rotation. The aircraft 110 may operate with the rotors 120 in any suitable orientation. Accordingly, embodiments of the present technology may convert the rotors 120 to any position or orientation between the positions and orientations described herein, or to other positions or orientations.

Although FIG. 1 and the description herein relate to converting the rotors 120 from the vertical plane of rotation for forward or horizontal flight to a horizontal plane of rotation for vertical thrust, embodiments of the present technology may also convert the rotors 120 in a reverse sequence, from a horizontal plane of rotation for vertical thrust to a vertical plane of rotation for forward or horizontal flight. Converting one way or the other is performed by operating the systems and/or carrying out the methods of the present technology in one direction or the other.

The aircraft 110 may include a fuselage 130, one or more wings 140 (which are visible in FIG. 2, but generally indicated by their general location in FIG. 1), and one or more conversion systems 150 configured in accordance with embodiments of the present technology, for performing the conversion sequence 100 and/or a reverse of the conversion sequence 100. For example, the aircraft 110 may include one conversion system 150 for each rotor 120. In a representative embodiment, the aircraft 110 may include one conversion system 150 on each side of the fuselage 130 to tilt corresponding rotors 120 on each side of the fuselage 130 (FIG. 1 illustrates one side of the aircraft 110; it is understood that the opposite side of the aircraft 110 may be symmetrical and may include identical or similar components as the side shown in FIG. 1).

Figure 2:
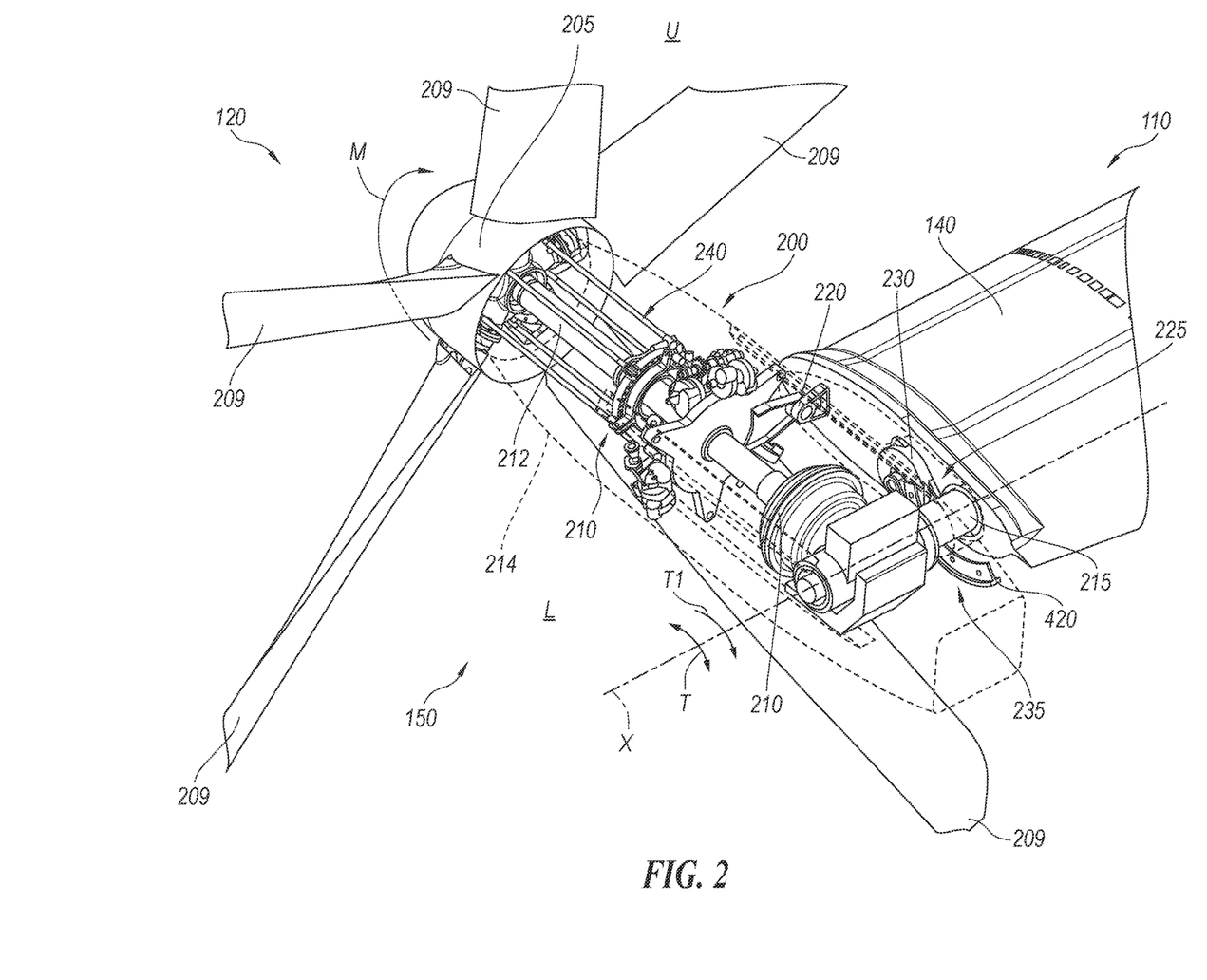
FIG. 2 illustrates a perspective schematic view of a conversion system configured in accordance with embodiments of the present technology.

FIG. 2 illustrates a perspective schematic view of a conversion system 150 configured in accordance with embodiments of the present technology. The aircraft 110 may include a pylon assembly 200 that is tiltable relative to the wing 140 around a tilt axis X that may be oriented generally along the span of the wing 140 (for example, parallel to the span of the wing 140), as generally illustrated by the tilt pathway T shown in FIG. 2. The rotor 120 may include a hub 205, which carries a plurality of blades 209. The pylon assembly 200 may carry the rotor 120 and suitable components 210 for spinning the rotor 120 to create propulsion (such as a rotor mast 212 connected to the hub 205, transmission components, motor components, engine components, and/or other components that spin a rotor 120). The pylon assembly 200 may include a nacelle 214 (illustrated by dashed lines in FIG. 2) to cover or support one or more components of the pylon assembly 200.

The pylon assembly 200 may be connected to the wing 140 via one or more components of the conversion system 150, which tilts the pylon assembly 200 (along with the rotor 120) relative to the wing 140. In some embodiments, the conversion system 150 may include a spindle 215 that connects the pylon assembly 200 to the wing 140 and which may extend along the tilt axis X. In some embodiments, the spindle 215 may be rigidly fixed to the pylon assembly 200 but it may be rotatable relative to the wing 140 to allow the pylon assembly 200 to tilt. In some embodiments, the conversion system 150 may further include a latch mechanism 220 positioned between the pylon assembly 200 and the wing 140. The latch mechanism 220 may releasably lock the pylon assembly 200 in the forward flight configuration ("airplane mode") shown in FIG. 2. For example, when the latch mechanism 220 is engaged, the pylon assembly 200 will not tilt, but the latch mechanism 220 may be selectively disengaged to allow the pylon assembly 200 to tilt (via the conversion system 150).

Figure 5:
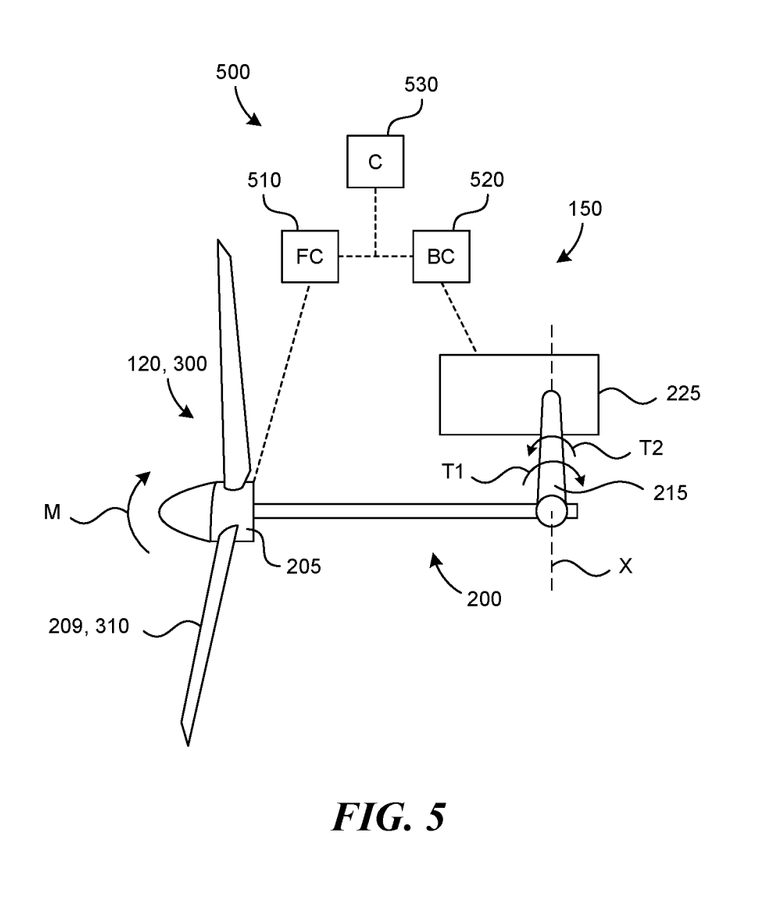
FIG. 5 illustrates a schematic view of a conversion system configured in accordance with embodiments of the present technology, including a conversion control system for operating the conversion system.

The conversion system 150 operates in part by using asymmetric thrust from the rotor 120 to tilt the pylon assembly 200. In particular, as the rotor blades 209 sweep through a circular area known as the "rotor disk," the rotor 120 selectively generates more thrust from one side of the rotor disk than from the other side of the rotor disk. This uneven (asymmetric) thrust creates a moment M about the hub 205 (the moment M is also shown in FIG. 5). Because the rotor mast 212 and the pylon assembly 200 support the rotor 120, the moment M causes torque about the spindle 215, which results in the pylon assembly 200 tilting about the spindle 215 (and the axis X) along a tilt pathway T. In other words, the conversion system 150 operates in part by selectively using asymmetric thrust from the rotor 120 to cause torque about the spindle 215.

For example, to convert to "helicopter mode," the rotor 120 may generate more thrust below the pylon assembly 200 (in the region "L" shown in FIG. 2) than above the pylon assembly 200 (in the region "U" shown in FIG. 2), which causes the moment M and tends to bias the pylon assembly 200 along a direction T1 (i.e., pitching rearward). To convert back to "airplane mode," the rotor 120 may generate asymmetric thrust in an opposite configuration (i.e., more thrust behind the pylon assembly 200 to bias the pylon assembly 200 forward, opposite the direction T1). In some embodiments, the asymmetric thrust may be generated by cyclic feathering of the blades 209, which is described in additional detail below.

To control the rate and amount of tilt, the conversion system 150 includes a brake mechanism 225 operatively positioned between the pylon assembly 200 and the wing 140. The brake mechanism 225 selectively counteracts the torque on the pylon assembly 200 by applying its own resistance force (e.g., torque) to the pylon assembly 200 in a direction opposite the direction of torque caused by the rotor's asymmetric thrust. In some embodiments, the brake mechanism 225 applies its resistance force directly to the spindle 215 to selectively resist rotation of the spindle 215. Accordingly, the brake mechanism 225 and the rotor 120 coordinate against each other to control tilting of the pylon assembly 200 (e.g., the rate and angularity of tilting).

In some embodiments, the brake mechanism 225 is carried on the wing 140. In some embodiments, the brake mechanism 225 includes an actuator assembly 230 that applies torque to the spindle 215 via a mechanism 235. In some embodiments, the mechanism 235 for applying torque from the actuator assembly 230 to the spindle 215 may include a portion of a gear ring connecting a rotating output of the actuator assembly 230 to the spindle 215 using a suitable connecting structure. The brake mechanism 225 and a suitable connecting structure for connecting the brake mechanism 225 to the spindle 215 is described in additional detail below with regard to FIG. 4.

In some embodiments, the rotor 120 may generate asymmetric thrust using cyclic feathering of the blades 209. For example, the blades 209 may be connected to pitch-adjustment mechanisms 240 to facilitate cyclic feathering. Embodiments of the present technology use cyclic feathering to intentionally create asymmetry of thrust to create the moment M, which results in torque on the pylon assembly 200 that tilts the pylon assembly 200 (and the rotor 120) between configurations.

Figure 3:
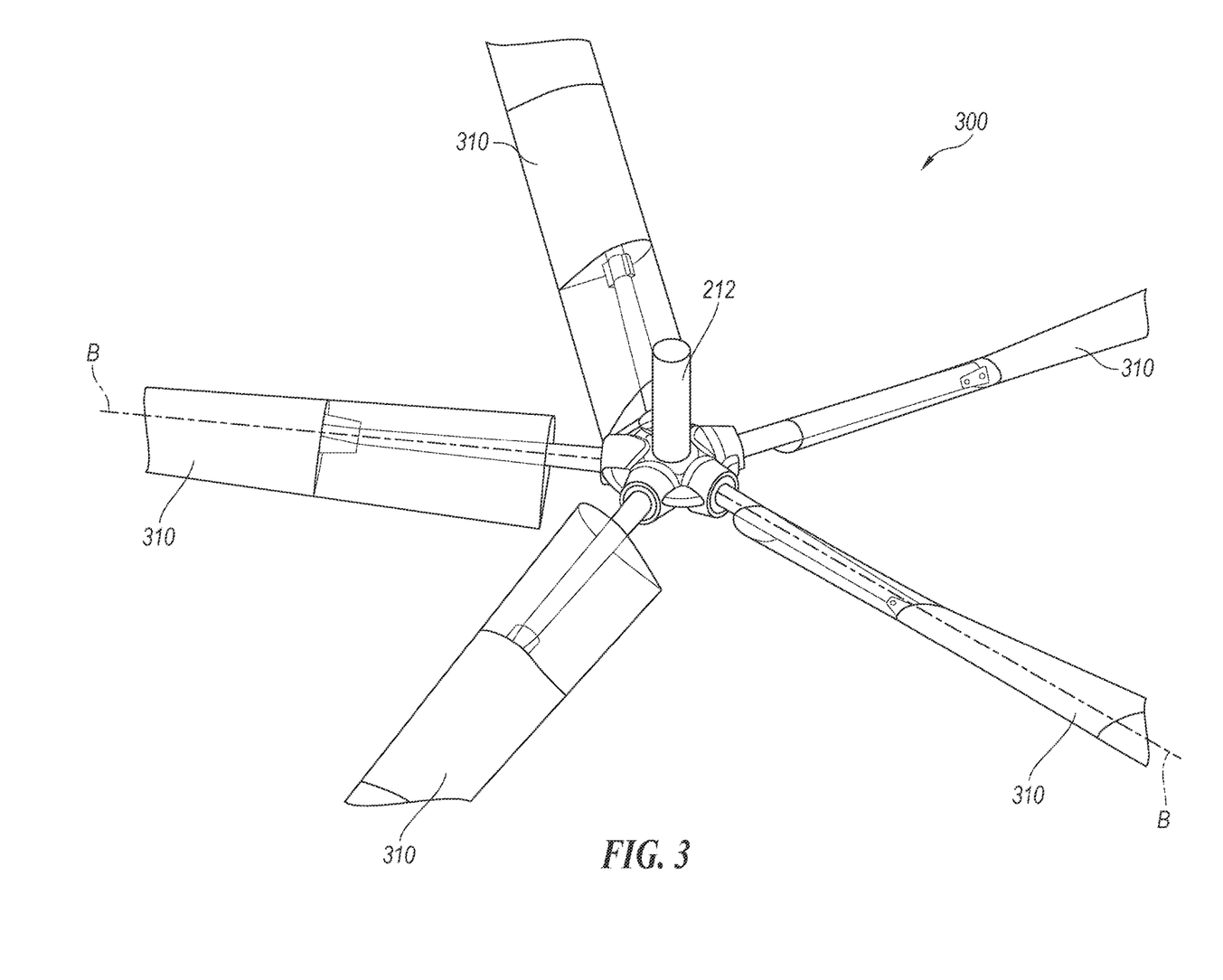
FIG. 3 illustrates a perspective schematic view of a portion of a rotor configured in accordance with embodiments of the present technology and suitable for use in conversion systems configured in accordance with embodiments of the present technology.

FIG. 3 illustrates a perspective schematic view of a portion of a rotor 300 configured in accordance with embodiments of the present technology and suitable for use as the rotor 120 in a conversion system 150. The rotor 300 may be attached to the rotor mast 212. The rotor 300 may be configured to be capable of generating the moment M for the tilt/conversion process. The blades 310 may be pivotable about their respective longitudinal blade axes B to facilitate adjustable pitch functionality for feathering control (for example, using pitch-adjustment mechanisms 240 as described above with regard to FIG. 2).

Although soft-in-plane rotors 300 with adjustable-pitch blades may be implemented as the rotor 120 in some embodiments, in other embodiments, other rotor types may be used, such as hinged rotors, fully articulated rotors, teetering-in-plane rotors, or other rotors capable of producing asymmetric thrust that creates a moment on the pylon assembly 200 to tilt the pylon assembly 200. Accordingly, the rotor 120 may include any suitable rotor and associated components capable of creating hub moment or torque that ultimately applies torque about the tilt axis X.

Figure 4:
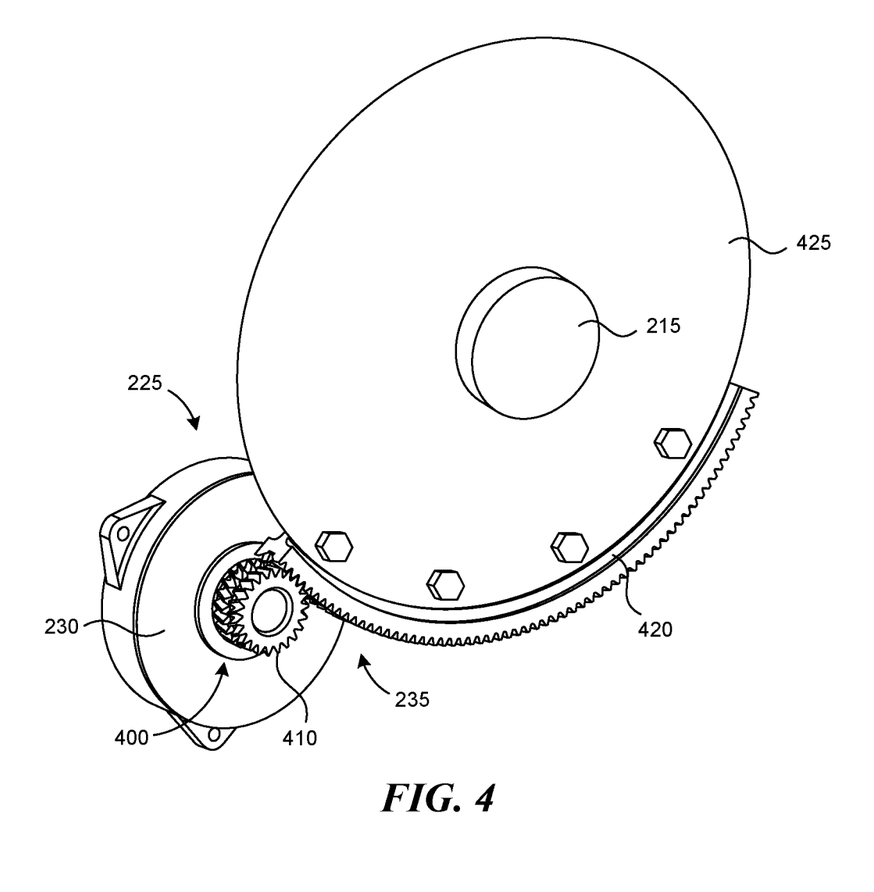
FIG. 4 illustrates a perspective view of a brake mechanism configured in accordance with embodiments of the present technology and suitable for use in conversion systems configured in accordance with embodiments of the present technology.

FIG. 4 illustrates a perspective view of the brake mechanism 225 configured in accordance with embodiments of the present technology, and suitable for use in conversion systems 150 configured in accordance with embodiments of the present technology. The brake mechanism 225 may include the actuator assembly 230, which may include a powered actuator with a rotating output 400. The output 400 of the actuator assembly 230 may be connected to the spindle 215 (a portion of which is shown in FIG. 4) via the mechanism 235, which may include a series of gears. For example, the rotating output 400 may be connected to a first gear 410 that engages a second gear 420. In some embodiments, the second gear 420 may be connected to the spindle 215 via a ring element 425. The ring element 425 may be rigidly attached to the spindle 215 and rigidly attached to the second gear 420 using fasteners or other suitable attachment devices. In some embodiments, the second gear 420 may include a partial ring or arc.

In some embodiments, the brake mechanism 225 needs to be sufficiently strong to hold the pylon assembly 200 (see FIG. 2) in "helicopter mode" such that the rotor 120 (see FIGS. 1 and 2) is in a horizontal plane of rotation for vertical thrust, and sufficiently strong to control/brake the tilt rate to and from that position. The strength of the brake mechanism 225 may vary depending on aircraft size and configuration. In some embodiments, the brake mechanism 225 is not capable of tilting the pylon assembly 200 on its own during flight. However, in some embodiments, the brake mechanism 225 may be sufficiently strong to tilt the pylon assembly 200 during non-flight operations, such as maintenance.

Although the brake mechanism 225 is described as including an actuator, conversion systems 150 configured in accordance with other embodiments of the present technology may include other brake mechanisms suitable for providing resistance to the moment about the tilt axis X and/or about the spindle 215 (see FIG. 2), such as those that do not include an actuator with a rotating output. For example, in some embodiments, the brake mechanism 225 may include a friction brake.

FIG. 5 illustrates a schematic view of the conversion system 150 configured in accordance with embodiments of the present technology, including a conversion control system 500 for operating the conversion system 150. As explained above in additional detail, the rotor 120 selectively applies a moment M on the hub 205, which results in torque about the tilt axis X, which tends to cause the pylon assembly 200 to rotate about the tilt axis X (via the spindle 215) along pathway T1. The brake mechanism 225 selectively resists the tilting by applying a force (i.e., torque) along pathway T2 opposite pathway T1 (i.e., opposite the tilting force from the rotor 120). By selectively resisting the tilting, the brake mechanism 225 controls the rate of tilting/conversion.

The control system 500 includes a flapping controller 510 and a brake controller 520. The flapping controller 510 is operatively connected to the rotor 120 to control the pitch and feathering of the blades 209, which controls the symmetry of thrust from the rotor 120 and therefore controls the torque on the spindle 215 from the rotor 120. The brake controller 520 is operatively connected to the brake mechanism 225 to control the resistance torque (e.g., by braking the movement of the spindle 215). The flapping controller 510 and the brake controller 520 may be connected to each other and/or to a flight controller 530, which may receive instructions from a pilot or another controller regarding whether to convert (tilt) the pylon assembly 200.

The flapping controller 510 and the brake controller 520 may be interfaced with each other in a feedback loop. In operation, the brake controller 520 monitors and controls the rate of tilting of the pylon assembly 200 by adjusting the resistance on the spindle 215 and by communicating with the flapping controller 510. The brake controller 520 also communicates with other pylons on the aircraft to coordinate the speed and positions of all pylons and rotors 120 on the aircraft relative to each other and to the wings 140. In some embodiments, the conversion system 150 includes inner loop logic that controls the rate of conversion (tilting) and the angularity of the rotors 120 relative to one another. The control system 500 manages both the tilting moment and the braking force, so the load on the brake mechanism 225 may be generally minimal during conversion.

The flapping controller 510, the brake controller 520, and/or the flight controller 530 may be programmed with instructions that, when executed, carry out a tilting operation by managing the flapping and braking of a conversion system 150. For example, the brake controller 520 may be programmed with instructions that, when executed, detect a maximum capacity of the brake mechanism 225 to handle torque, and in response, the brake controller 520 and/or the flight controller 530 may instruct the flapping controller 510 to adjust feathering to reduce the moment. The flight controller 530 and/or the brake controller 520 may be programmed with instructions that, when executed, detect that the brake mechanism 225 is capable of managing more torque, and in response, the flight controller 530 and/or the brake controller 520 may instruct the flapping controller 510 to adjust feathering to increase the moment.

Advantages of the present technology include conversion systems that have less overall weight and require less maintenance than conventional conversion systems. For example, conversion systems configured in accordance with embodiments of the present technology eliminate the need for a ball screw conversion actuator, which is common to conventional systems. Embodiments of the present technology may be implemented in existing aircraft or they may be implemented in future tiltrotor aircraft. Although first and second configurations (such as "airplane mode" and "helicopter mode") are described with regard to the tilt positions of the rotors and pylons, embodiments of the present technology include positions and configurations between those first and second configurations, orientations, and modes.

Some embodiments of the technology described herein may take the form of computer- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller or data processor that is specifically programmed, configured or constructed to perform one or more of the computer-executable instructions described herein. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers and the like). Information handled by these computers can be presented at any suitable display medium, including an LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

Communication connections between components may include a direct, wired coupling or a wireless protocol such as, Bluetooth®, Wi-Fi™, a LAN, a WAN, a cellular network, a WLAN, other IEEE 802.xx networks, the Internet, or other connections suitable for communicating data.

From the foregoing, it will be appreciated that some embodiments of the present technology have been described herein for purposes of illustration, but various modifications may be made without deviating from the disclosed technology. For example, certain aspects of the technology described in the context of particular embodiments may be combined or eliminated in other embodiments.

Further, while advantages associated with some embodiments of the technology have been described in the context of those embodiments, some embodiments may also exhibit said advantages, and not all embodiments need necessarily exhibit such advantages to fall within the scope of the present technology. Accordingly, the present disclosure and associated technology may encompass other embodiments not expressly described or shown herein.

What is claimed is:

1. A tiltrotor aircraft comprising:
    a pylon assembly supported by a wing of the aircraft, wherein the pylon assembly is tiltable around a tilt axis, the pylon assembly being tiltable relative to the wing between a first configuration and a second configuration;
    a rotor supported by the pylon and configured to provide thrust for the aircraft along a first thrust direction when the pylon assembly is in the first configuration and along a second thrust direction different from the first thrust direction when the pylon assembly is in the second configuration, wherein the rotor is configured to selectively provide asymmetric thrust to generate torque about the tilt axis in a first torque direction; and
    a brake mechanism operatively positioned between the pylon assembly and the wing, the brake mechanism positioned to selectively resist tilting of the pylon assembly relative to the wing by applying torque to the pylon assembly about the tilt axis in a second torque direction that is opposite the first torque direction; the brake mechanism being further positioned to selectively tilt the pylon assembly about the tilt axis in the second torque direction, during a non-flight operation, to a maintenance position.

2. The tiltrotor aircraft of claim 1, further comprising a latch mechanism positioned between the pylon assembly and the wing and configured to releasably lock the pylon assembly in the first configuration.

3. The tiltrotor aircraft of claim 1, wherein the brake mechanism is attached to the wing.

4. The tiltrotor aircraft of claim 1, wherein the brake mechanism comprises an actuator assembly.

5. The tiltrotor aircraft of claim 4, wherein the actuator assembly comprises a rotating output.

6. The tiltrotor aircraft of claim 5, wherein the rotating output comprise a first gear, and wherein the aircraft further comprises a second gear engaged with the first gear, the second gear being connected to the pylon assembly to apply the torque about the tilt axis in the second torque direction.

7. The tiltrotor aircraft of claim 1, comprising a rotatable spindle that connects the pylon assembly to the wing, wherein the spindle extends along the tilt axis and the brake mechanism applies torque to the spindle.

8. The tiltrotor aircraft of claim 1, wherein the rotor is a soft-in-plane rotor.

9. The tiltrotor aircraft of claim 1, wherein the rotor comprises adjustable-pitch blades and the aircraft comprises pitch-adjustment mechanisms for adjusting the pitch of the adjustable-pitch blades.

10. The tiltrotor aircraft of claim 1, further comprising one or more controllers programmed with instructions that, when executed, cause the pylon assembly to tilt from the first configuration to the second configuration or from the second configuration to the first configuration by adjusting the asymmetric thrust to regulate the torque in the first torque direction and by adjusting the brake mechanism to regulate the torque in the second torque direction.

11. A conversion system for a tiltrotor aircraft, the conversion system configured to control tilting of a pylon assembly relative to a wing of the aircraft during a flight operation, the conversion system comprising:
   a means for generating asymmetric thrust with a propulsion rotor carried by the pylon assembly to generate a first torque on the pylon assembly in a first direction; and
   a brake mechanism operatively positioned between the pylon assembly and the wing, the brake mechanism positioned to selectively resist the first torque on the pylon assembly by applying a second torque to the pylon assembly in a second direction opposite the first direction; the brake mechanism being further positioned to selectively tilt the pylon assembly about the tilt axis in the second torque direction, during a non-flight operation, to a maintenance position.

12. The conversion system of claim 11, wherein the brake mechanism comprises an actuator assembly with a rotating output.

13. The conversion system of claim 12, wherein the rotating output applies the second torque to a spindle connected to the pylon.

14. The conversion system of claim 11, wherein the means for generating asymmetric thrust comprises a means for feathering one or more blades of the propulsion rotor.

15. The conversion system claim 11, further comprising one or more controllers programmed with instructions that, when executed, cause the pylon assembly to tilt relative to the wing of the aircraft by controlling the means for generating asymmetric thrust and by controlling the brake mechanism.

16. A method of tilting a rotor of a tiltrotor aircraft, the method comprising:
   generating asymmetric thrust during a flight operation using the rotor, wherein the asymmetric thrust applies a torque force to a pylon assembly carrying the rotor about a tilt axis in a first torque direction during a flight operation;
   generating a resistance force from a brake mechanism to resist the torque force, wherein the resistance force is applied to the pylon assembly;
   generating a torque force to the pylon assembly about a tilt axis in a second torque direction, during a non-flight operation, to a maintenance position.

17. The method of claim 16, wherein generating the resistance force and generating a torque force each comprise operating an actuator with a rotating output.

18. The method of claim 17, wherein generating the resistance force and generating a torque force are each applied to a spindle between the pylon and the wing.

19. The method of claim 16, wherein generating asymmetric thrust comprises flapping or feathering one or more blades of the rotor.

20. The method of claim 16, further comprising operating a releasable latch mechanism positioned between the pylon and the wing.

* * * * *